United States Patent

Kobayashi et al.

[11] Patent Number: 5,859,123
[45] Date of Patent: Jan. 12, 1999

[54] WATER-BASED FLUORINE-CONTAINING EMULSION

[75] Inventors: Satoru Kobayashi, Miyoshi; Kazuhiko Maeda, Hino; Yoshi Hirashima, Tokyo; Seiji Hasegawa, Higashimatsuyama; Kentaro Tsutsumi, Kawagoe, all of Japan

[73] Assignee: Central Glass Company, Limited, Yamaguchi, Japan

[21] Appl. No.: 749,698

[22] Filed: Nov. 15, 1996

[30] Foreign Application Priority Data

Nov. 15, 1995 [JP] Japan .................................... 7-297057

[51] Int. Cl.$^6$ .................................................. C08L 27/12
[52] U.S. Cl. .......................... 524/805; 524/806; 524/822; 524/823; 524/824; 524/825; 526/249; 526/254; 526/255; 526/279
[58] Field of Search ..................... 524/805, 806, 524/822, 823, 824, 825; 526/249, 254, 255, 279

[56] References Cited

U.S. PATENT DOCUMENTS

| | | | |
|---|---|---|---|
| 4,886,862 | 12/1989 | Kuwamura et al. | 526/247 |
| 4,925,907 | 5/1990 | Miyabayashi et al. | 526/255 |
| 5,077,362 | 12/1991 | Watanabe et al. | 526/255 |
| 5,258,447 | 11/1993 | Koishi et al. | 524/544 |
| 5,348,991 | 9/1994 | Yoshikawa et al. | 524/402 |
| 5,616,645 | 4/1997 | Kuwamura et al. | 524/546 |

FOREIGN PATENT DOCUMENTS

| | | |
|---|---|---|
| A-4-202484 | 7/1992 | Japan . |
| B-4-40365 | 7/1992 | Japan . |
| A-5-25421 | 2/1993 | Japan . |

*Primary Examiner*—Margaret W. Glass
*Attorney, Agent, or Firm*—Evenson, McKeown, Edwards & Lenahan, P.L.L.C.

[57] ABSTRACT

The present invention relates to a water-based fluorine-containing emulsion. This emulsion contains a fluorine-containing copolymer in a disperse phase thereof This copolymer is prepared by copolymerizing: (A) a fluoroolefin, (B) an organosilicon compound containing an olefinic unsaturated bond and an alkoxysilyl group, (C) an unsaturated carboxylic acid represented by a general formula of $CH_2=CH-(CH_2)_n-COOH$ where n is an integer of from 3 to 15, and (D) at least one other copolymerizable monomer. A paint prepared from the emulsion is superior in storage stability and mechanical stability, although this paint belongs to a one-package paint. A coated film formed by applying the paint is superior in water resistance in its early stages, stain resistance, and weather resistance.

21 Claims, No Drawings

WATER-BASED FLUORINE-CONTAINING EMULSION

BACKGROUND OF THE INVENTION

This invention relates to a water-based fluorine-containing emulsion used for a water-based paint.

Hitherto, fluoropolymers prepared from a monomers' composition containing a fluoroolefin have widely been used for paints, because these polymers are superior in weather resistance. For example, there is known a copolymer prepared by copolymerizing a fluoroolefin, an aliphatic vinyl ester such as vinyl acetate, and another monomer (see JP-B-4-40865). This copolymer is soluble in various solvents, and is used for preparing paints that are curable at ambient temperature and are used in the fields of architecture and the like. These paints, however, each contain a relatively large amount of organic solvent. Therefore, there are risks of fire, a hazard to human body, air pollution, and the like. In view of this, there has been a demand for non-organic-solvent paints, particularly for water-based paints. To meet this demand, there have been a lot of researches into water-based fluorine-containing paints that are curable at ambient temperature. An emulsion used for these paints is generally produced by emulsion polymerization, using a large amount of emulsifying agent. This emulsifying agent remains even in a film prepared by applying a water-based paint to a substrate, thereby increasing coefficient of water absorption of this film. Thus, this film is inferior to those prepared by applying organic solvent type paints, in water resistance and stain resistance. In view of this inferiority, there have been other researches into water-based fluorine-containing paints each prepared by using a monomer containing an alkoxysilyl group which is a cross-linking group (see JP-A-4-202484 and JP-A-5-25421). It is, however, difficult to obtain both of a satisfactory stability of this alkoxysilyl group (cross-linking site) in emulsion and a satisfactory degree of cross-linking of a paint's polymer after formation of the coated film, because these characteristics conflict with each other. In other words, if such water-based paint is made satisfactory in the cross-linking degree, this paint becomes unsatisfactory in emulsion stability during storage. In contrast, if such water-based paint is made satisfactory in emulsion stability during storage, this paint becomes unsatisfactory in the cross-linking rate, thereby making the coated film inferior in water resistance in its early stages. In view of this, it has been proposed to add a catalyst for increasing the cross-linking rate of this paint, immediately before the application of this paint. With this, however, this paint becomes a two-package paint that is inferior to a one-package paint in workability.

SUMMARY OF THE INVENTION

It is an object of the present invention to provide a water-based fluorine-containing emulsion that is free of the above-mentioned drawbacks It is a specific object of the present invention to provide a water-based fluorine-containing emulsion that can be stably stored, and is practically satisfactory in workability upon its application, and belongs to a one-package paint of which cross-linking rate is satisfactorily high. Because it belongs to such one-package paint, it provides a coated film that is superior in water resistance in its early stages, in stain resistance, and in weather resistance.

According to the present invention, there is provided a water-based fluorine-containing emulsion comprising a fluorine-containing copolymer in a disperse phase thereof. This fluorine-containing copolymer is prepared by copolymerizing (A) a fluoroolefin, (B) an organosilicon compound containing an olefinic unsaturated bond and an alkoxysilyl group, (C) an unsaturated carboxylic acid represented by a general formula of $CH_2=CH-(CH_2)_n-COOH$ where n is an integer of from 8 to 15, and (D) at least one other copolymerizable monomer, without using an emulsifier. This emulsion is practically improved in its storage stability. Although the emulsion provides a water-based one-package paint, the coated film formed by applying the paint is satisfactorily high in the polymer's cross-linking rate. Therefore, this film is superior to those formed by applying conventional water-based paints, in water resistance in its early stages and in stain resistance.

According to the present invention, there is further provided a water-based fluorine-containing emulsion comprising a fluorine-containing copolymer that consists essentially of 10–70 mol % of a first structural unit derived from a fluoroolefin, 0.1–20 mol % of a second structural unit derived from an organosilicon compound containing an olefinic unsaturated bond and an alkoxysilyl group, 0.1–20 mol % of a third structural unit derived from an unsaturated carboxylic acid represented by a general formula of $CH_2=CH-(CH_2)_n-COOH$ where n is an integer of from 3 to 15, and 30–85 mol % of a fourth structural unit derived from at least one other copolymerizable monomer, based on a total number of moles of all of said first second, third and fourth structural units.

According to the present invention, there is still further provided a method for producing a water-based fluorine-containing emulsion having a fluorine-containing copolymer, the method comprising a step of copolymerizing, in a medium containing water, (A) 10–70 mol % of a fluoroolefin, (B) 0.1–20 mol % of an organosilicon compound containing an olefinic unsaturated bond and an alkoxysilyl group, (C) 0.1–20 mol % of an unsaturated carboxylic acid represented by a general formula of $CH_2=CH-(CH_2)_n-COOH$ where n is an integer of from 3 to 15, and (D) 30–85 mol % of at least one other copolymerizable monomer, based on a total number of moles of all of said fluoroolefin, said organosilicon compound, said unsaturated carboxylic acid, and said at least one other copolymerizable monomer, in order to prepare said fluorine-containing copolymer in said medium.

DESCRIPTION OF THE PREFERRED EMBODIMENTS

In the following, there will be described in detail a water-based fluorine-containing emulsion according to the present invention.

In the invention, a fluoroolefin, the monomer (A), is a necessary component for providing a fluorine-containing copolymer of the invention with weather resistance. This fluoroolefin has in the molecule at least one fluorine atom and a polymerizable double bond. Its examples are fluoroolefins each having a carbon atom number of from about 2 to about 6, such as chlorotrifluoroethylene, vinyl fluoride, vinylidene fluoride, trifluoroethylene, tetrafluoroethylene, hexafluoropropylene, and hexafluoroisobutene. Of these, chlorotrifluoroethylene is the most preferable example. In the invention, there may be used as the monomer (A) one fluoroolefin selected from the above-mentioned examples or a combination of at least two thereof. This combination also preferably contains chlorotrifluoroethylene. It is preferable that the amount of the monomer (A) is 10–70 mol %, more preferably 30–60 mol %, based on the total number of moles of all the monomers. If it is less than 10 mol %, a coated film may become inferior in weather resistance. If it is greater than 70 mol %, a coated film may not satisfactorily be formed.

In the invention, an organosilicon compound containing an olefinic unsaturated bond and an alkoxysilyl group, the monomer (B), is a component for providing the copolymer with cross-linking sites. In other words, the alkoxysilyl group remains stable in the emulsion during its is storage. In contrast, the alkoxysilyl group contained in a coated film turns into a silanol group through hydrolysis. It is assumed that this silanol group induces cross-linking of the copolymer. For example, it is assumed that intermolecular cross-linking is formed by siloxane bond through condensation of silanol groups with each other, thereby improving a coated film in water resistance, stain resistance, and solvent resistance. An olefinic unsaturated bond of the monomer (B) is not particularly limited. Its examples are vinyl group, allyl group, acryloyl group, and methacryloyl groups. An alkoxysilyl group of the monomer (B) is also not particularly limited. It may be a substituted silyl or alkylsilyl group that has a silicon atom of which at least one hydrogen atom bonded to the silicon atom has been replaced by an alkoxy group having a carbon atom number of from 1 to 4, methoxy group, ethoxy group, n-propoxy group, isopropoxy group, n-butoxy group, sec-butoxy group, and/or ter-butoxy group. Unlimited examples of the monomer (B) are vinyltrimethoxysilane, vinyltriethoxysilane, vinyltris(n-propoxy)silane, vinyltriisopropoxysilane, vinyltributoxysilane, vinyltris(methoxyethoxy)silane, vinylmethyldiethoxysilane, vinylmethyldiisopropoxysilane, vinylmethyldi-n-propoxysilane, vinyldimethylethoxysilane, vinyldimethylisopropoxysilane, vinyldimethyl-n-propoxysilane, vinylmethoxydiethoxysilane, vinylmethoxydiisopropoxysilane, vinylmethoxydi-n-propoxysilane, vinylethoxydimethoxysilane, vinylethoxydiisopropoxysilane, vinylethoxydi-n-propoxysilane, vinyl-n-propoxydimethoxysilane, vinyl-n-propoxydiethoxysilane, vinyl-n-propoxydiisopropoxysilane, 3-(N-allyl-N-glycidyl)aminopropyltrimethoxysilane, 3-(N-allyl-N-methacroyl)aminopropyltrimethoxysilane, N,N-bis[3-(trimethoxysilyl)propyl]methacrylamide, N,N-bis[3-(methyldimethoxysilyl)propyl]methacrylamide, 3-methacryloxypropyltrimethoxysilane, and 3-methacryloxypropyltris(trimethyloxy)silane. Of these examples, vinyl silanes containing alkoxysilyl groups are preferably used in the invention, because these vinyl silanes are easily copolymerized with other monomers. Furthermore, a vinyl trialkoxy silane is more preferably used. In the invention, there may be used as the monomer (B) one organosilicon compound selected from the above-mentioned examples or a combination of at least two thereof. This combination also preferably contains at least one of the vinyl silanes. The amount of the monomer (B) is preferably from 0.1 to 20 mol %, more preferably from 0.1 to 5 mol %, still more preferably from 0.1 to 3 mol %, based on the total number of moles of all the monomers. If it is less than 0.1 mol %, the cross-linking degree may not become sufficient. With this, a coated film may become inferior in water resistance and stain resistance. If it is greater than 20 mol %, the emulsion may become unstable during its storage.

In the invention, there is used as the monomer (C) an unsaturated carboxylic acid represented by a general formula of $CH_2=CH-(CH_2)_n-COOH$ where n is an integer of from 3 to 15. This carboxylic acid serves as a reactive emulsifier to stabilize the polymerization system during the reaction. Therefore, it becomes possible to reduce the amount of unreactive emulsifier, due to the use of the monomer (C). In general, when an unreactive emulsifier is not compatible with the resin, this emulsifier bleeds from a coated film and deposits on its surface. The thus deposited emulsifier absorbs water and/or contaminants. Even if an unreactive emulsifier is compatible with the resin, the resin itself is increased in water absorption by the emulsifier. With this, a coated film may become inferior in water resistance. Thus, it is assumed that the monomer (C) serves to improve a coated film in water resistance and stain resistance.

The above-mentioned unsaturated carboxylic acid introduces carboxyl group into a fluorine-containing copolymer of the invention, and this carboxyl group serves as an acid catalyst to catalyze cross-linking of alkoxysilyl groups. In general, it is necessary to add a cross-linking catalyst (e.g., di-n-dibutyl tin(IV) dilaurate and organic acids) to an emulsion prepared from a resin solution having alkoxysilyl group, in order to increase the cross-linking degree of polymer, immediately before the application of this emulsion. In contrast to this, according to the present invention, it is not necessary to use such cross-linking catalyst. Thus, a water-based fluorine-containing emulsion according to the present invention provides a one-package paint that is sufficient in the cross-linking rate. This paint according to the present invention is improved in workability as compared with two-package paints, and provides a coated film that is improved in water resistance in its early stages and stain resistance, due to a high cross-linking rate. It is assumed that, when a water-based emulsion of the invention is stored, the carboxyl groups introduced by the monomer (C) exist on the surface of the copolymer's particles in the emulsion, and thus that the carboxyl groups do not actually serve as a catalyst for cross-linking of alkoxysilyl groups. In contrast to this, it is assumed that, after a coated film has been formed by applying a paint of the emulsion to a substrate, the carboxyl groups uniformly diffuse in the coated film due to water evaporation and thus serve as a catalyst for cross-linking of alkoxysilyl groups. Thus, the emulsion can stably be stored for a long period of time, and the coated film becomes superior in water resistance in its early stages and in stain resistance, due to that the copolymer is high in cross-linking rate.

Examples of the monomer (C) are 5-hexenoic acid, 6-heptenoic acid, 7-octenoic acid, 8-nonenoic acid, 9-decenoic acid, 10-undecylenic acid, 11-dodecylenic acid, and 17-octadecylenic acid. In the invention, there may be used as the monomer (C) one unsaturated carboxylic acid selected from the above-mentioned examples or a combination of at least two thereof. Of these examples, 10-undecylenic acid is preferably used, because it is particularly superior in polymerizability with other monomers and provides an emulsion that is particularly superior in stability during both its polymerization reaction and its storage. If n is less than 3 in a general formula of $CH_2=CH-(CH_2)_n-COOH$ representing the monomer (C), the monomer (C) is solubilized in water. With this, the monomer (C) does not serve to improve the emulsion stability. If n is greater than 15, the monomer (C) becomes inferior in polymerizability with other monomers. The amount of the monomer (C) is preferably from 0.1 to 20 mol %, more preferably from 0.1 to 5 mol % and still more preferably from 0.1 to 2 mol %, based on the total number of moles of all the monomers. If it is less than 0.1 mol %, the monomer (C) may not sufficiently stabilize the emulsion. If the amount of unreactive emulsifier is increased to sufficiently stabilize the emulsion, a coated film becomes inferior in water resistance. If it is greater than 20 mol %, a coated film may become inferior in resistance against a basic solution.

In the invention, there is used as the monomer (D) at least one other copolymerizable monomer that is not particularly limited. Examples of the monomer (D) are aliphatic vinyl esters such as vinyl acetate, vinyl butyrate, vinyl propionate, vinyl pivalate, vinyl caproate, vinyl caprylate, vinyl caprate, vinyl laurate, vinylcyclohexylcarboxylic acid, neononanoic acid othenyl ester, and neodecanoic acid ethenyl ester; alkylvinyl ethers such as ethylvinyl ether, propylvinyl ether, and cyclohexylvinyl ether; carboxylic allyl esters such as allyl acetate, allyl propionate, allyl butyrate, allyl isobutyrate, allyl caproate, allyl caprylate, allyl laurate, and allylcyclohexylcarboxylic acid; allyl ethers such as methylallyl ether, ethylallyl ether, and butylallylether, hydroxyl-containing allyl ethers such as hydroxybutylallyl ether, ethylene glycol monoallyl ether. propylene glycol monoallyl ether, triethylene glycol monallyl ether, and glycerol monallyl ether; hydroxyl-containing vinyl ethers such as hydroxyethylvinyl ether, hydroxybutylvinyl ether, and hydroxymethylvinyl ether; α-olefins such as ethylene, propylene, 1-butene, and 1-octene; unsaturated esters and ethers each having a hydrophilic side chain such as polyethylene oxide chain or polypropylene oxide chain; halogenated olefins such as vinyl chloride, and vinylidene chloride; aromatic vinyl compounds such as styrene, α-methylstyrene, and vinyltoluene; methacryloyl compounds such as ethyl methacrylate; acryloyl compounds such as ethyl acrylate; unsaturated carboxylic acid anhydrides and derivatives thereof such as maleic anhydride, itaconic anhydride, citraconic anhydride, tetrahydrophthalamic anhydride, unsaturated carboxylic acids other than those of the monomer (C), such as methacrylic acid, acrylic acid, crotonic acid, vinyl acetate, and maleic acid; dicarboxylic acids; compounds prepared by neutralizing unsaturated carboxylic acids with basic substances, such as sodium 10-undecylenate; and monomers each having sufonic acid group. Of these examples, aliphatic vinyl esters and alkyl vinyl ethers are preferably be cited, because these compounds are particularly superior in polymerizability with other monomers and provide an emulsion from which a coated film is satisfactorily formed on a substrate. Furthermore, an aliphatic vinyl ester having a carbon atom number of from 4 to 14 is more preferable. The amount of the monomer (D) is preferably from 30 to 85 mol % and more preferably from 35 to 70 mol %, based on the total number of moles of all the monomers. If it is less than 30 mol %, a coated film may not satisfactorily be formed. If it is greater than 85 mol %, a coated film may become inferior in weather resistance.

In the invention, the above-mentioned fluorine-containing copolymer is obtained by emulsion polymerization of the monomers (A) to (D), using as dispersion medium water or a mixture of water and an organic solvent. Examples of this organic solvent are alcohols such as methanol, ethanol, isopropanol, n-butanol, isobutanol, tert-butanol, and sec-butanol; dihydric alcohols such as ethylene glycol, and diethylene glycol; ether alcohols such as methyl cellosolve, ethyl collosolve and isopropyl cellosolve; aliphatic hydrocarbons; aromatic hydrocarbons such as xylene; and aliphatic esters such as butyl acetate and ethyl acetate. At least one of organic solvents may be mixed with water to prepare the dispersion medium. The organic solvent is preferably in an amount of not greater than 20 wt %, based on the total weight of the dispersion medium, and is preferably uniformly distributed in the dispersion medium.

In the invention, pH of the dispersion medium during the polymerization reaction and that of the emulsion are respectively preferably within a range of from 5 to 9 and more preferably within a range of from 6 to 9. Therefore, it is preferable to use a pH adjusting agent. Examples of this pH adjusting agent to be used in the invention are inorganic salts such as sodium carbonate, potassium carbonate, sodium hydrogenorthophosphate, sodium thiosulfate, and sodium tetraborate; and organic salts such as triethylamine, triethanolamine, and dimethylethanolamine. In case that the pH adjusting agent is used, it is in an amount of from 0.05 to 5 parts by weight per 100 parts by weight of the total weight of the dispersion medium. The pH adjusting agent may be added to the dispersion medium at the time of emulsion polymerization, or at a time of the completion of polymerization, or at both of these times.

In the invention, the emulsion polymerization of the monomers (A)–(D) starts by the addition of a polymerization initiator. As this, a water-soluble initiator is preferably used, from the viewpoints of polymerization stability and of workability. Examples of the initiator are persulfates such as potassium persulfate and ammonium persulfate; hydrogen peroxide. At least one of these compounds may be combined with a reducing agent such as sodium sulfite, to prepare a redox polymerization initiator which may also be used in the invention. The amount of the polymerization initiator is preferably from 0.0001 to 5 parts by weight and more preferably from 0.001 to 3 parts by weight, per 100 parts by weight of the total of all the monomers. In the invention, the optimum temperature of the emulsion polymerization initiation is decided, depending mainly on the type of polymerization initiator. The initiation temperature is preferably from 0° to 100° C. and more preferably from 30° to 70° C.

In the invention, it is optional to use a dispersion stabilizer (emulsifying agent) for improving emulsion stability. Examples of the stabilizer usable in the invention are conventional surfactants such as anionic surfactants, nonionic surfactants, cationic surfactants, and amphoteric surfactants; and water-soluble polymers such as polyvinyl alcohol and methyl cellulose. Of these, nonionic surfactants are preferably used, because these surfactants are well compatible with the polymer. In particular, it is more preferable to use nonionic surfactants each having a value of HLB (hydrophile-lipohile balance) from 10 to 18. It is optional to use one dispersion stabilizer or a combination of at least two dispersion stabilizers. In case that the dispersion stabilizer is used, its amount is preferably up to 10 parts by weight and more preferably up to 5 parts by weight, per 100 parts by weight of the total of all the monomers. If its amount is too much, a coated film may become inferior in water resistance and weather resistance.

A water-based fluorine-containing emulsion according to the present invention itself may be used as a paint. It is, however, optional to prepare a paint by adding to the emulsion at least one conventional additive. Examples of this are plasticizer, organic solvent, coalescing agent, dispersant, wetting agent, pigment, viscosity adjusting agent, levelling agent, antifreezing agent, antiseptic agent, defoaming agent, ultraviolet absorbing agent, and stabilizers such as antioxidant.

In the invention, it is optional to add an alkyl silicate represented by the following general formula (1), to the emulsion.

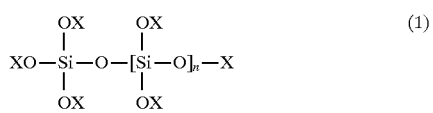

(1)

where X is an alkyl group having a carbon atom number from 1 to 8, and n is 0 or an integer that is up to 11. Here, alkyl silicate is referred to as tetraalkoxcysilane or its condensates. Examples of the alkyl silicate are tetramethoxysilane, tetraethoxysilane, tetraisopropoxysilane, tetra-n-propoxysilane, tetra-n-butoxysilane, tetra-2-methoxy-ethoxysilane, tetra-2-ethylhexyloxysilane, and partial hydrolysates of these. The alkyl silicate may be dissolved or dispersed in water, in one of various organic solvents, or in a mixture of at least two solvents, to prepare an alkyl silicate solution to be added to the emulsion. In particular, the alkyl silicate is preferably dissolved in coalescing agent.

The present invention will be illustrated with reference to the following nonlimitative Examples 1–3.

EXAMPLE 1

In this example, a water-based fluorine-containing emulsion according to the present invention was prepared as follows. At first, as shown in Table 1, a 2-liter stainless steel autoclave provided with a stirrer was charged with a monomer mixture of 125.7 g (25 mol %) of vinyl butyrate (VBu), 81.2 g (10 mol %) of neononanoic acid ethenyl ester, VEOVA-9 (trade name) of Showa-Shell Chem. Co., 39.5 g (7 mol %) of vinyl pivalate (VPv), 25.1 g (3 mol %) of vinyltriethoxysilane (VTES), and 40.6 g (5 mol %) of undecylenic acid (UA), 570 g of ion exchanged water, 2.58 g of ammonium persulfate (APS), 1.14 g of sodium carbonate decahydrate ($Na_2CO_3.10H_2O$), and 11.4 g of nonionic emulsifying agent, NEWCOL 504 (trade name) of Nippon Nyukazai Co. having a HLB of 16.0. Then, the autoclave was cooled down, using ice water. Then, the inside pressure of the autoclave was increased to 5 kg/cm$^2$, using nitrogen gas. Then, the gas atmosphere in the autoclave was replaced by nitrogen gas, and this operation was repeated three times. After that, the autoclave was reduced to about 10 mmHg, thereby removing dissolved air from a liquid in the autoclave. Then, 257.0 g (50 mol %) of chlorotrifluoroethylene (CTFE) was introduced into the autoclave. Then, the emulsion polymerization was carried out at 50° C. for 24 hr, thereby to produce a water-based fluorine-containing emulsion having a solid matter concentration of 48.6%.

The thus produced emulsion was adjusted to have a solid matter concentration of 45% by diluting the emulsion with water. Then, 10 parts by weight of butylcarbitol acetate as coalescing agent was added to the emulsion, per 100 parts by weight of solid matter of the emulsion, and an aqueous 28%-ammonia solution was added to the emulsion to adjust its pH to 7, thereby to prepare a water-based fluorine-containing paint. Then, this paint was applied to an aluminum plate using an applicator. The coated aluminum plate was dried for three days at room temperature, to obtain a dried coated film having a thickness of about 0.2 mm.

EXAMPLES 2–6 AND COMPARATIVE EXAMPLES 1–3

In each of these examples and comparative examples, Example 1 was repeated except in that selective changes were made as shown in Tables 1–3 in the kind and quantity of monomers and other additives for preparing a water-based emulsion. In every water-based emulsion, the concentration of a solid matter was adjusted to 45% by concentrating the emulsion using evaporator or by diluting the emulsion with water.

TABLE 1

| Charged Monomers | Water-based Emulsions | | |
| --- | --- | --- | --- |
| | Example 1 | Example 2 | Example 3 |
| CTFE | 257.0 g (50 mol %) | 251.0 g (50 mol %) | 180.0 g (40 mol %) |
| TFE* | — | — | 38.6 g (10 mol %) |
| VBu | 125.7 g (25 mol %) | — | — |
| VEOVA-9 | 81.2 g (10 mol %) | — | 142.1 g (20 mol %) |
| VAc* | — | 81.5 g (22 mol %) | — |
| VPv | 39.5 g (7 mol %) | — | — |
| VEOVA-10* | — | 128.0 g (15 mol %) | 114.7 g (15 mol %) |
| VTES | 25.1 g (3 mol %) | 40.9 g (5 mol %) | 36.7 g (5 mol %) |
| ECAE* | — | 27.9 g (3 mol %) | — |
| Propylene | — | — | 6.5 g (4 mol %) |
| PKA-5003* | — | — | 17.4 g (1 mol %) |
| UA | 40.6 g (5 mol %) | 39.6 g (5 mol %) | 35.5 g (5 mol %) |
| Ammonium Persulfate | 2.58 g | 2.58 g | 2.58 g |
| Na2CO3.10H2O | 1.14 g | 1.14 g | 1.14 g |
| NEWCOL 504 | 11.4 g | 11.4 g | 11.4 g |
| Ion-exchanged Water | 570 g | 570 g | 570 g |
| Solid Matter Conc. | 48.6% | 49.0% | 48.3% |

*TFE: tetrafluoroethylene; VAc: vinyl acetate; VEOVA-10 (trade name): neodecanoic acid ethenyl ester made by Showa-Shell Chemical. Co.; ECAE: ε-caprolactone-modified allyl ether; and PKA-5003 (trade name): polyoxyethylene allyl ester made by NIPPON OIL & FATS CO., LTD.

TABLE 2

| Charged Monomers | Water-based Emulsions | | |
| --- | --- | --- | --- |
| | Example 4 | Example 5 | Example 6 |
| CTFE | 249.0 g (50 mol %) | 236.0 g (50 mol %) | 257.0 g (50 mol %) |
| TFE* | — | — | — |
| VBu | 117.1 g (24 mol %) | — | 125.7 g (25 mol %) |
| VEOVA-9 | 189.1 g (24 mol %) | 283.8 g (38 mol %) | 81.2 g (10 mol %) |
| VAc* | — | 34.9 g (10 mol %) | — |
| VPv | — | — | 39.5 g (7 mol %) |
| VEOVA-10* | — | — | — |
| VTES | 8.1 g (1 mol %) | 7.5 g (1 mol %) | 25.1 g (3 mol %) |
| ECAE* | — | — | — |
| Propylene | — | — | — |
| PKA-5003* | — | — | — |
| UA | 7.9 g (1 mol %) | 7.5 g (1 mol %) | 40.6 g (5 mol %) |
| Ammonium Persulfate | — | — | 2.58 g |
| Potassium Persulfate | 2.31 g | 2.19 g | — |
| Na2CO3.10H2O | 1.14 g | 1.14 g | 1.14 |
| NEWCOL 504 | — | — | — |
| NEWCOL 566* | 22.8 g | 22.8 g | — |

TABLE 2-continued

| | Water-based Emulsions | | |
|---|---|---|---|
| Charged Monomers | Example 4 | Example 5 | Example 6 |
| Ion-exchanged Water | 570 g | 570 g | 570 g |
| Solid Matter Conc. | 48.5 wt % | 47.6 wt % | 42.1 wt % |

*NEWCOL 566 (trade name): nonionic emulsifying agent of Nippon Nyukazai Co. having a HLB of 14.0.

TABLE 3

| | Water-based Emulsions | | |
|---|---|---|---|
| Charged Monomers | Com. Ex. 1 | Com. Ex. 2 | Com. Ex. 3 |
| CTFE | 260.0 g (50 mol %) | 260.0 g (50 mol %) | 260.0 g (40 mol %) |
| TFE | — | — | — |
| VBu | 127.2 g (25 mol %) | 127.1 (25 mol %) | 127.2 (25 mol %) |
| VEOVA-9 | 82.1 g (10 mol %) | 82.1 g (10 mol %) | 82.1 g (10 mol %) |
| VAc | — | — | — |
| VPv | 57.1 g (10 mol %) | 57.1 g (10 mol %) | 57.1 g (10 mol %) |
| VEOVA-10 | — | — | — |
| VTES | 42.4 g (5 mol %) | — | 42.4 g (5 mol %) |
| ECAE | — | — | — |
| Propylene | — | — | — |
| PKA-5003 | — | — | — |
| UA | — | 41.1 g (5 mol %) | — |
| Ammonium Persulfate | 2.58 g | 2.58 g | 2.58 g |
| Na2CO3.10H2O | 1.14 g | 1.14 g | 1.14 g |
| NEWCOL 504 | — | 11.4 g | 56.9 g |
| Ion-exchanged Water | 570 g | 570 g | 570 g |
| Solid Matter Conc. | 46.1% | 48.1% | 49.5% |

EVALUATION TESTS

In each of Examples 1–6 and Comparative Examples 1–3, the following evaluation tests were conducted on the paint and the coated film. The results are shown in Tables 4–5.

In a dispersibility test on the paint, the paint was stored for four weeks at 50° C., and then the condition of the paint was observed with the naked eye to evaluate dispersibility of the disperse phase thereof. As to the results of this test, "A" means that the paint did not change and was a homogeneous emulsion, and "B" means that there occurred aggregation of the disperse phase.

In a mechanical stability test on the paint, the paint was stirred for 5 minutes using TK-HOMODISPER (trade name) of Tokushu Kika Kogyou Co. with a rotation rate of 3,000 rpm, and then the condition of the paint was observed with the naked eye to evaluate mechanical stability of the paint. As to the results of this test, "A" means that no aggregation occurred, and "B" means that aggregation occurred.

In a water resistance test on the coated film, the coated aluminum plate was immersed in water for 96 hr at room temperature. After that, the coated film condition was examined with the naked eye. As to the results of this test, "A" means that the appearance of the coated film did not change at all, "B" means that it changed a little, "C" means that it changed much, and blisters and the like occurred thereon.

In a stain resistance test on the coated film, a 10% carbon/water suspension was dropped on the coated film. After that, the coated film was dried for 2 days at 40° C. With this, the dropped suspension turned into a carbon stain. Then, it was tried to wipe the stain off using a piece of gauze. Then, the condition of the carbon stain was observed with the naked eye. As to the results of this test, "A" means that the carbon stain was almost completely wiped off and remained a little thereon, and "B" means that the carbon stain was not wiped off and remained obtrusively.

In a weather resistance test on the coated film, an accelerated test was conducted with a sunshine weathermeter for 4,000 hr, and the surface gloss of each coated film at 60 degrees was measured before and after the weather resistance test to indicate the degree of weather resistance by percentage of the retained gloss.

TABLE 3

| | Ex. 1 | Ex. 2 | Ex. 3 | Ex. 4 | Ex. 5 | Ex. 6 |
|---|---|---|---|---|---|---|
| Dispersibility Test | A | A | A | A | A | A |
| Mechanical Stability Test | A | A | A | A | A | A |
| Water Resistance Test | A | A | A | A | A | A |
| Stain Resistance Test | A | A | A | A | A | A |
| Weather Resistance Test (%) | 95 | 96 | 92 | 98 | 97 | 97 |

TABLE 4

| | Com. Ex. 1 | Com. Ex. 2 | Com. Ex. 3 |
|---|---|---|---|
| Dispersibility Test | B | A | A |
| Mechanical Stability Test | B | A | A |
| Water Resistance Test | B | C | C |
| Stain Resistance Test | B | B | B |
| Weather Resistance Test (%) | 70 | 85 | 68 |

What is claimed is:

1. A water-based fluorine-containing emulsion comprising:
   a fluorine-containing copolymer that is prepared by copolymerizing (A) a fluoroolefin, (B) an organosilicon compound containing an olefinic unsaturated bond and an alkoxysilyl group, (C) an unsaturated carboxylic acid represented by a general formula of $CH_2=CH-(CH_2)_n-COOH$ where n is an integer of from 3 to 15, and (D) at least one other copolymerizable monomer.

2. An emulsion according to claim 1, wherein said unsaturated carboxylic acid is 10-undecylenic acid.

3. An emulsion according to claim 1, wherein said fluoroolefin is chlorotrifluoroethylene, said organosilicon compound is a vinyl silane containing said alkoxysilyl group, said unsaturated carboxylic acid is 10-undecylenic acid, and said at least one other copolymerizable monomer is at least one compound selected from the group consisting of aliphatic vinyl esters and alkyl vinyl ethers.

4. An emulsion according to claim 1, which has a pH of from 5 to 9.

5. An emulsion according to claim 1, said fluoroolefin is in an amount of from 10 to 70 mol %, based on a total number of moles of all of monomers used for preparing said fluorine-containing copolymer.

6. An emulsion according to claim 1, wherein said fluoroolefin has at least one fluorine atom, a polymerizable double bond, and a carbon atom number of from about 2 to about 6, said fluoroolefin being at least one compound selected from the group consisting of chlorotrifluoroethylene, vinyl fluoride, vinylidene fluoride, trifluoroethylene, tetrafluoroethylene, hexafluoropropylene, and hexafluoroisobutene.

7. An emulsion according to claim 1, wherein said organosilicon compound is in an amount of from 0.1 to 20 mol %, based on a total number of moles of all of monomers used for preparing said fluorine-containing copolymer.

8. An emulsion according to claim 1, wherein said unsaturated carboxylic acid is at least one compound selected from the group consisting of 5-hexenoic acid, 6-heptenoic acid, 7-octenoic acid, 8-nonenoic acid, 9-decenoic acid, 10-undecylenic acid, 11-dodecylenic acid, and 17-octadecylenic acid.

9. An emulsion according to claim 1, wherein said unsaturated carboxylic acid is in an amount of from 0.1 to 20 mol %, based on a total number of moles of all of monomers used for preparing said fluorine-containing copolymer.

10. An emulsion according to claim 1, wherein said at least one other copolymerizable monomer is in an amount of from 30 to 85 mol %, based on a total number of moles of all of monomers used for preparing said fluorine-containing copolymer.

11. An emulsion according to claim 1, which further comprises an organic solvent as a dispersion medium thereof.

12. An emulsion according to claim 11, wherein said at least one organic solvent is in amount of up to 20 wt %, based on a total weight of said dispersion medium.

13. A water-based fluorine-containing emulsion comprising:

a fluorine-containing copolymer that consists essentially of 10–70 mol % of a first structural unit derived from a fluoroolefin, 0.1–20 mol % of a second structural unit derived from an organosilicon compound containing an olefinic unsaturated bond and an alkoxysilyl group, 0.1–20 mol % of a third structural unit derived from an unsaturated carboxylic acid represented by a general formula of $CH_2=CH-(CH_2)_n-COOH$ where n is an integer of from 3 to 15, and 30–85 mol % of a fourth structural unit derived from at least one other copolymerizable monomer, based on a total number of moles of all of said first, second, third and fourth structural units.

14. An emulsion according to claim 13, wherein said fluoroolefin is at least one of chlorotrifluoroethylene and tetrafluoroethylene.

15. An emulsion according to claim 13, wherein said organosilicon compound is a vinyltrialkoxysilane having three alkoxyl groups that are the same or different groups, each of said three alkoxyl groups having a carbon atom number of from 1 to 4.

16. An emulsion according to claim 13, wherein said unsaturated carboxylic acid is 10-undecylenic acid.

17. An emulsion according to claim 13, wherein said at least one other copolymerizable monomer is at least one compound selected from the group consisting of aliphatic vinyl esters, first alkyl vinyl ethers, and second alicyclic alkyl vinyl ethers, each of said aliphatic vinyl esters being derived from a fatty acid that has an optional branch having a carbon atom number of from 2 to 12, each of said first alkyl vinyl ethers having a branch having a carbon atom number of from 1 to 6.

18. An emulsion according to claim 13, which has a pH of from 5 to 9.

19. A method for producing a water-based fluorine-containing emulsion having a fluorine-containing copolymer, the method comprising a step of:

copolymerizing, in a medium containing water, (A) 10–70 mol % of a fluoroolefin, (B) 0.1–20 mol % of an organosilicon compound containing an olefinic unsaturated bond and an alkoxysilyl group, (C) 0.1–20 mol % of an unsaturated carboxylic acid represented by a general formula of $CH_2=CH-(CH_2)_n-COOH$ where n is an integer of from 3 to 15, and (D) 30–85 mol % of at least one other copolymerizable monomer, based on a total number of moles of all of said fluoroolefin, said organosilicon compound, said unsaturated carboxylic acid, and said at least one other copolymerizable monomer, in order to prepare said fluorine-containing copolymer in said medium.

20. The emulsion according to claim 1, wherein said emulsion does not contain an emulsifier.

21. The method for producing a emulsion according to claim 19, wherein said copolymerizing does not use an emulsifier.

* * * * *